(12) United States Patent
Stoll et al.

(10) Patent No.: US 6,325,101 B1
(45) Date of Patent: Dec. 4, 2001

(54) CHOKE VALVE

(75) Inventors: Kurt Stoll, Esslingen; Ulrich Kees, Homburg, both of (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/614,848

(22) Filed: Jul. 12, 2000

(30) Foreign Application Priority Data

Jul. 14, 1999 (DE) .............................................. 199 32 982

(51) Int. Cl.$^7$ ...................................................... F16K 1/34
(52) U.S. Cl. ................................... 137/625.33; 137/625.3
(58) Field of Search ............................. 137/625.3, 625.33

(56) References Cited

U.S. PATENT DOCUMENTS

| | | | | |
|---|---|---|---|---|
| 4,041,982 | * | 8/1977 | Lindner | 137/625.3 |
| 5,090,450 | * | 2/1992 | Pelech et al. | 137/625.3 |
| 5,113,908 | * | 5/1992 | Steinke | 137/625.3 |
| 5,141,028 | * | 8/1992 | Cohen | 137/625.3 |
| 5,261,453 | * | 11/1993 | Hekkert et al. | 137/625.38 |
| 5,337,784 | * | 8/1994 | Grubb | 137/625.38 |
| 5,351,717 | * | 10/1994 | Saito | 137/625.12 |
| 5,427,147 | * | 6/1995 | Henriksson | 137/625.3 |
| 5,516,079 | * | 5/1996 | Baumann | 251/61 |

FOREIGN PATENT DOCUMENTS

| | | |
|---|---|---|
| 39 03 781 A1 | 8/1990 | (DE) . |
| 197 48 343 A1 | 5/1999 | (DE) . |
| 1291716 | 3/1962 | (FR) . |

* cited by examiner

Primary Examiner—John Fox
(74) Attorney, Agent, or Firm—Hoffmann & Baron, LLP

(57) ABSTRACT

A choke valve, whose choke body comprises a cylindrical choke position plunging coaxially into an inlet duct. The inlet flow duct is connected on the one hand with an inlet and on the other hand communicates through transfer openings with outlet flow ducts extending through the wall of the flow duct, such outlet flow ducts begin connected with the outlet. Between the choke piston and the inlet flow duct wall a seal area is provided, which on resetting the choke body is shifted axially and, cooperating with the transfer apertures, sets the aperture for the pressure medium.

9 Claims, 4 Drawing Sheets

CHOKE VALVE

BACKGROUND OF THE INVENTION

The invention relates to a choke valve comprising a choke body able to be set in the direction of its longitudinal axis and which in a manner dependent on its position (choking position) between an inlet and an outlet makes available a smaller or larger flow aperture.

THE PRIOR ART

Known choke valves of this type, as described for instance in the textbook "Einfuhurng in die Pneumatik", Meixner/Kobler, page 132, possess a spherical choke body, which in manner dependent on the choke setting plunges to a greater or less extent into an opening and so makes available varying apertures for the respective fluid medium. The choke body is rotatably mounted on the valve housing by means of a screw thread and its axial position or, respectively, choke setting may be varied by rotation.

A substantial disadvantage of such spherical choke bodies is the non-linear setting characteristic. The aperture as a rule varies in a square law function in relation to the change of the axial position of the choke body so that it is extremely hard to find reproducible settings. A further disadvantage is that thread play between the choke body and the valve housing leads to slight pendulum movements of the choke cone on resetting the choke. This in turn leads to irregular variations in the aperture and to a still further impairment of setting operations.

SHORT SUMMARY OF THE INVENTION

One object of the invention is to provide a choke valve of the type initially mentioned with which leads to a linear characteristic and makes possible extremely exact, reproducible settings.

In order to achieve these and/or other objects appearing from the present specification, claims and drawings, in the present invention the choke body possesses a cylindrical choke piston, which in every choke setting plunges coaxially into an inlet flow duct communicating with the inlet, said choke piston being in constant sealing contact at a peripheral seal area with the wall of the inlet flow duct, the axial position of the seal area assumed in relation to the inlet flow duct being dependent on the instantaneous choke setting and outlet ducts are provided in the wall of the inlet duct on the one hand communicating with the outlet and on the other hand opening via transfer openings, which are distributed along the setting stroke of the seal area, into the inlet duct, the aperture being defined by the cross section, which is made available toward the upstream section of the inlet flow duct, of the transfer openings.

The part of the choke body responsible for the aperture made available is now no longer spherical in form but constituted by a cylindrical choke piston constantly plunging into an inlet flow duct communicating with the inlet. The seal area present between the choke piston and the inlet flow duct wall then prevents pressure medium supplied through the inlet flow duct flowing past the choke piston. Consequently it is only possible for the pressure medium to flow away via the transfer openings, provided in the inlet flow duct wall upstream from the seal area toward the upstream section of the inlet flow duct. Dependent on the particular setting of the choke the total aperture-defining cross section of the transfer openings communicating with the upstream section of the inlet duct, may be preset to varied amounts. By a suitable selection of the design and arrangement of the transfer openings it is then possible to produce a linear setting characteristic in an extremely simple manner. Since, unlike the case of the prior art, the aperture is not in essential respects preset by the annular gap surrounding the choke body, furthermore any irregularities in the axial position of the choke piston are not disadvantageous. Moreover owing to the seal area it is possible to prevent significant leakage past the choke piston so that so that any danger of a pendulum movement is prevented at the outset. In this respect owing to the cooperation of the choke body and the inlet flow duct wall at the seal area it is also possible to achieve a guiding effect having a favorable effect on the positional stability of the choke body.

Further advantageous developments of the invention are defined in the claims.

The outlet flow ducts can be at least partly constituted by separate ducts similar to drilled holes and/or have a slot-like configuration. The individual ducts may be so placed that their transfer openings directed into the inlet flow duct lie on a helical path along the periphery of the inlet flow duct.

Moreover the outlet flow ducts may also be at least partially formed by the intermediate spaces or interstices of a porous inlet flow duct wall. The latter may for instance be produced by the use of a sintered metal or of a plastic material provided with fine interstices.

The choke valve may additionally be provided with an integrated check valve so that all in all a combined choke and check valve is produced. The valve member of the check valve may for instance be in the form of a lip seal and be more especially borne by the wall of the inlet flow duct.

The wall of the inlet flow duct may readily be an integral part of the valve housing of the choke valve. However, it is particularly convenient to fashion the inlet flow duct wall as a component of a valve cartridge, which may be fitted in any suitably adapted housing provided with an inlet and an outlet. This renders possible extremely simple integration of the choke valve in the housing of any fluid power equipment, for instance fluid power drives.

The choke body may be fixed in position by means of a screw thread so that it is turned for changing the setting of the choke, this simultaneously resulting in a shift in the axial position. However as a more advantageous design a structure actuating means is proposed in which the rotary actuating member is arranged to be rotatable and is simultaneously locked axially, whereas the choke body is prevented from rotating and is able to be moved axially, there being a threaded engagement between the rotary actuating member and the choke body. Turning of the rotary actuating member results in this case in a purely translatory movement of the choke body, the axial position of the rotary actuating member remaining unchanged. This means that, irrespectively of the setting made, there are extremely compact dimensions. Furthermore such a structure makes it easier to adopt features, which render possible a digital setting characteristic of the choke valve. Thus detent means can be provided for detachable attachment of the rotary actuating member in different angular positions, the selection grid pitch bearing a direct linear relation to the aperture set by the choke piston.

Further advantageous developments and convenient forms of the invention will be understood from the following detailed descriptive disclosure of embodiments thereof in conjunction with the accompanying drawings.

LIST OF THE SEVERAL VIEWS OF THE FIGURES.

Figure 1:
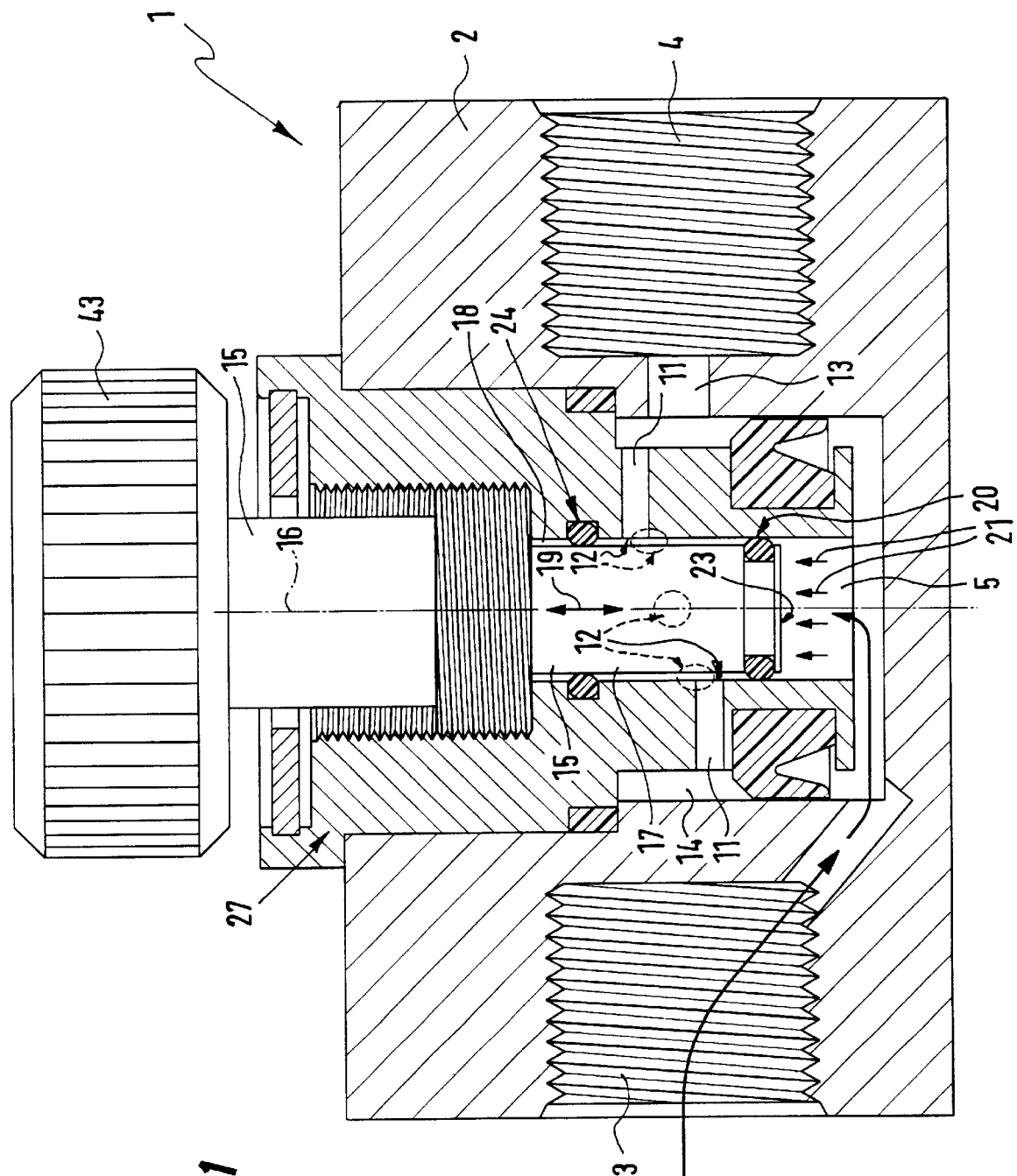
FIG. 1 shows a first design of the choke valve in accordance with the invention in a longitudinal section, the choke piston being in a closed position, which completely prevents flow of the pressure medium from the inlet to the outlet.

DETAILED ACCOUNT OF WORKING EMBODIMENTS OF THE INVENTION.

All choke valves 1 illustrated comprise a housing 2 with an inlet 3 and an outlet 4 for a fluid pressure medium, more especially compressed air. The inlet 3 and the outlet 4 are provided with means for the connection of fluid ducts leading to other equipment, such means here being internal screw threads.

In the interior of the housing 2 a linear inlet flow duct 5 is located of circularly cylindrical cross section. Its one axial end portion, in the following referred to as the upstream duct section 6 is in constant communication with the inlet 3 via at least one first fluid duct 7.

The inlet flow duct wall 8 peripherally delimiting the inlet duct 5 has several radially continuous outlet flow ducts 11 extending through it. These outlet flow ducts 11 for their part open on the one hand at apertures 12 peripherally in the inlet flow duct 5. On the other hand they are connected via at least one second fluid duct 13 with the outlet 4.

The choke valve 1 furthermore possesses an elongated choke body 15, which is so mounted on the housing 2 that it may be shifted along its longitudinal axis 16 linearly. The choke body 15 is responsible for the intensity of choking of the choke valve 1 because, dependent on its instantaneous axial position it, it makes available a larger or smaller aperture between the inlet 3 and the outlet 4. The positions then assumed by the choke body 15 will here be termed choke settings.

The choke body 15 is arranged coaxially in relation to the inlet flow duct 5. At one of its axial end regions it is provided with a cylindrical choke piston 17 plunging from the external end portion 18 (opposite to the upstream duct section) of the inlet flow duct 5—into this inlet flow duct 5. The cross sectional form of the choke piston 17 is at least essentially the same as that of the inlet flow duct 5 so that the choke body 15 is arranged in the interior of the inlet flow ducts with minimum radial play and in an axially moving manner. The direction of axial setting of the choke piston 17, which coincides with the longitudinal axis 16, is indicated by a double arrow 19.

Coaxially between the choke piston 17 and the inner face of the inlet flow duct wall 8 a first annular seal area 20 is defined. In the illustrated working embodiment it is defined by having an annular seal 22 secured to the choke piston 17 peripherally and making sliding contact with the wall 8 of the inlet flow duct. This first seal area 20 is best directly axially adjacent to the front end face 23, which is turned toward the upstream duct section 6 of the inlet flow duct 5, of the choke piston 17.

The choke piston 17 hence constitutes a moving wall closing the inlet flow duct 5 on the side, which is opposite to the upstream duct section 6 in a sealing fashion. In cooperation with the transfer openings 12, which are distributed in the longitudinal direction of the inlet flow duct 5 and consequently along the path of setting of the first seal area 20, that has the effect that, dependent on the respective choke setting, the duct section of the transfer openings 12 made available into the upstream duct section 6, may be varied. This cross section represents the transfer opening, controlled by the choke valve and setting the rate of fluid flow from the inlet 3 to the outlet 4.

Figure 2:
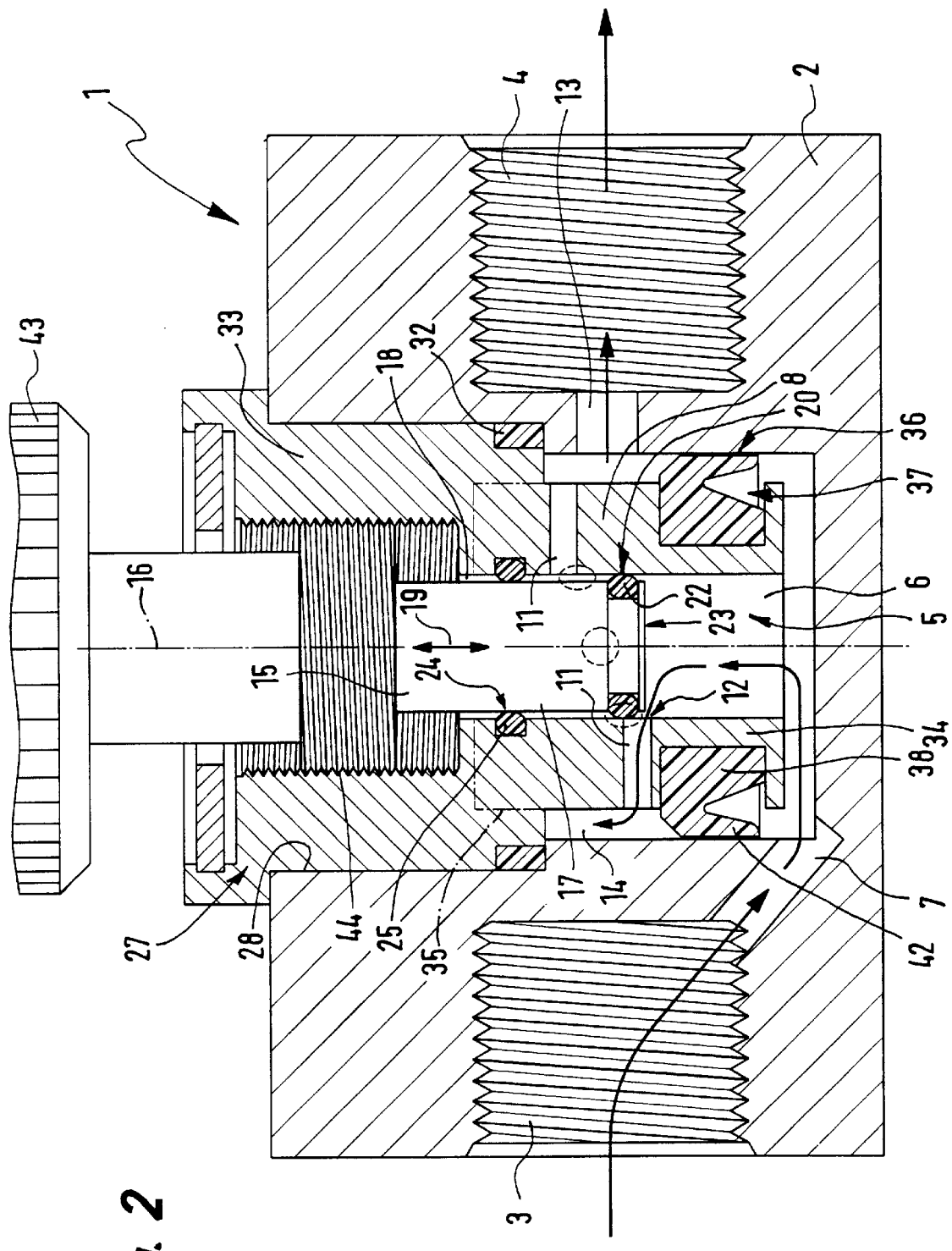
FIG. 2 shows the choke valve of FIG. 1 with a different axial position of the choke body in a selected choke setting.

In the illustrated working embodiment in accordance with FIGS. 1 and 2 the outlet flow ducts 11 are constituted by separate ducts like drilled holes, which extend through the wall 8 of the inlet flow duct between the inlet flow duct 5 and the annular space 14 radially. The axially distributed arrangement of the transfer openings 12 is in this case due to the fact that the transfer openings 12 are arranged along an imaginary helical line along the periphery of the inlet flow duct 5. This offers the advantage of its being possible to have an axially overlapping arrangement of the transfer openings 12 if desired.

It is also possible for the outlet flow ducts 11 to be designed in the form of slots. Furthermore the length of the outlet flow ducts 11 may in principle be freely selected and same could be constituted by extremely short cutouts in the wall.

FIG. 1 indicates the choke valve 1 in a closed setting, in which the transfer cross section, which is made available, between inlet 3 and the outlet 4 is equal to zero. The choke body 15 is in this case moved so far into the inlet flow duct 5 that the first seal area 20 is arranged between the transfer openings 12 and the duct section 6 with the connected the inlet 3 of the inlet flow duct 5. The pressure obtaining at the inlet 3 accordingly acts as indicated by the arrows 21 only on the front end face of the 23 of the choke piston 17 without being able to pass to the transfer openings 12. FIG. 1 makes it clear that the choke valve in the example offers the advantage that in case of need the connection between the inlet 3 and the outlet 4 may be interrupted with a reliable seal.

FIG. 2 shows an arbitrary choke setting in which the first seal area 20 is displaced so far toward the outer end region 18 of the inlet flow duct 5 that at least one of the transfer openings 12 is at least partly connected with the upstream duct section 6. The pressure medium is consequently able to flow out through the released or uncovered aperture into the annular space 14 and thence to the outlet 4.

In order to prevent compressed air from flowing via the outlet ducts 11—which open on the axial side opposite to the upstream duct section 6 of the first seal area 20 into the inlet duct 5—past the choke body 15 to the outside, a second seal area 24 is provided between the wall 8 of the inlet flow duct and the choke body 15 in the outer end region of the inlet flow duct 5. Its axial setting in relation to the inlet duct 5 is never changed and it is set for example by the provision axially clear of the transfer openings 12 of an annular seal 25, coaxially surrounding the choke piston 17, with the production of a seal, on the wall 8 inlet flow duct 25.

Figure 3:
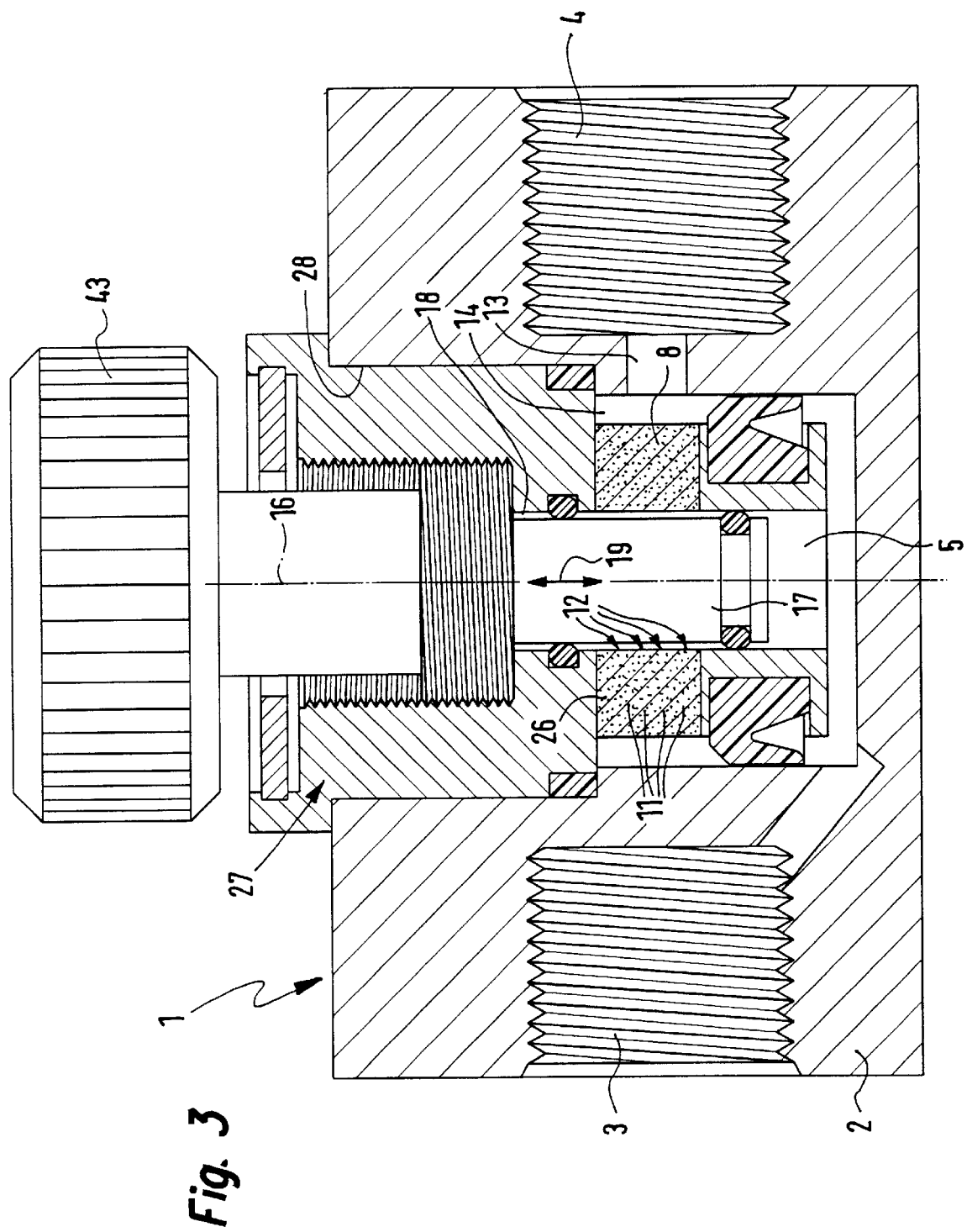
FIG. 3 shows a further embodiment of the choke valve in a manner of representation corresponding to that of FIG. 1.

The choke valve 1 depicted in FIG. 3 is the same as that of FIGS. 1 and 2 apart from the provision of the outlet flow ducts 11. The wall 8 of the inlet flow duct is in this case at least in part made porous, the pore-like, fine interstices forming the outlet flow ducts 11 and the interstices, which are inwardly and outwardly radially open, constitute the transfer openings of the outlet flow ducts 11. The porous character of the wall 8 of the inlet flow duct may for example be produced by using a sintered material, and more especially sintered metal, plastic materials also being able to be employed as well. In the case of the working example the porous region of the wall 8 of the inlet flow duct is formed by a suitably configured annular body 26, which for instance may be connected by a adhesive bond with the other components of the wall 8 of the inlet flow duct.

It will be clear that the different embodiments of the outlet flow ducts 11 can be combined together in many different ways.

The choke valves illustrated offer the further advantage that the wall 8 of the inlet flow duct is component of a valve cartridge 27 inserted in the housing 2. The housing 2 possesses a recess 28, in which the valve cartridge is firmly mounted with a sealing effect. For providing such seal at least one seal 32, which is molded in situ may be present, it being expedient to not here that all seal employed for the choke valve are firmly molded on the respective carrier means, for example by injection molding.

In the illustrated working embodiment the valve cartridge 27 possesses a holding body 33, which is for example cylindrical and which is firmly connected with the wall 8 of the inlet flow duct, such wall being constituted in the working embodiment by a sleeve-like coaxial tail 34 of the holding body 33. While the holding body 33 is firmly mounted in a complementary section of the recess 28, the tail 34 possesses a diameter, which is smaller than the corresponding section of the recess 28, the remaining intermediate space constituting the above mentioned annular space 14. The valve cartridge 27 may be more particularly screwed or bonded in place or (preferably) press fitted.

At 35 FIG. 2 indicates in chained lines that the wall 8 of the inlet flow duct may be in the form of a component, separate from the holding body 33, that is firmly anchored in relation to the holding body 33, it being possible for it to constitute an insert body in the holding body 33.

The choke valve in accordance with the working examples is designed as a choke check valve. It comprises a bypass duct 36, which is not affected by the setting of the choke body 15 and which is responsible for a unidirectional fluid connection between the inlet and the outlet as related to the outlet flow ducts 11. It permits return of the pressure medium from the outlet 4 to the inlet 3, whereas in the opposite direction it stops flow.

In the illustrated working embodiment the additional check valve 37 is produced by providing a lipped sealing ring 38, having a flexible seal lip 42, between the outer periphery and the tail 34 and the inner periphery of the recess 28. The seal is preferably secured on the tail 34, the flexurally elastic sealing lip 42 engaging the inner face of the recess 28. This means that the lip sealing ring 38 constitutes a component of the valve cartridge 27 and may be handled together with it.

It will be clear that instead of the lip sealing ring 38 it is also possible for any other suitable valve member to be employed.

Axial setting of the choke body 15 with the choke piston 17 is brought about in the working examples respectively using a rotary actuating member 43. In the working examples of FIGS. 1 through 3 the member 43 is locked in rotation with the choke body 15, which for its part is mounted in a screwing manner by means of a threaded connection 44 in the holding body 33. On rotation of the rotary actuating member 43 the choke body is turned as well and will be simultaneously shifted axially. Since the change in the degree to which the rotary actuating member 43 stands proud of the housing 2 is in certain circumstances disadvantageous, an alternative design of the rotary actuating means associated with the choke body 15 will be described with reference to FIG. 4.

Figure 4:
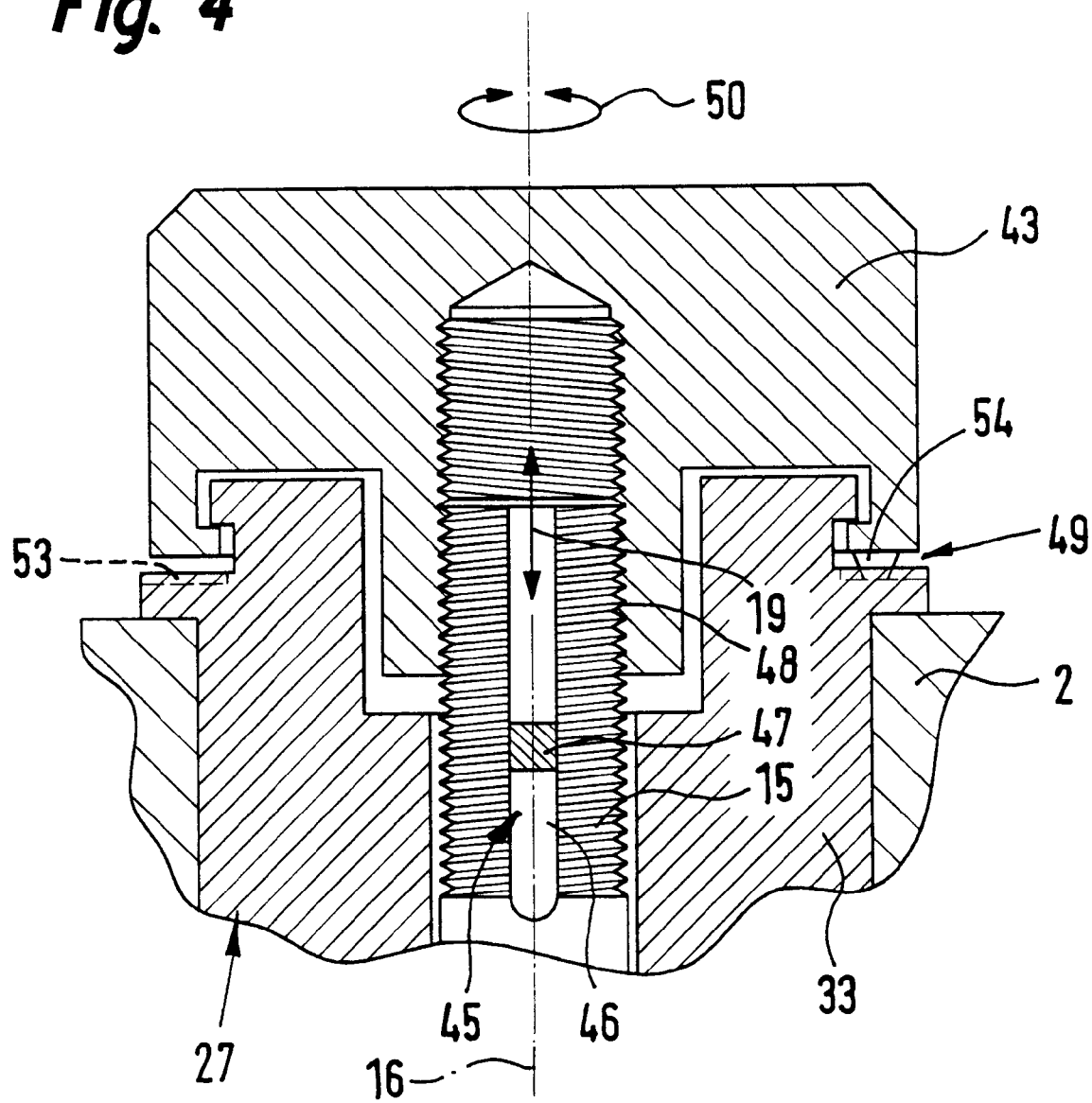
FIG. 4 shows a section of the actuating means of a further embodiment of the choke valve, again in a longitudinal section.

In accordance with FIG. 4 there is still a rotary actuating member 43, but it is fixed so that it is not able to be moved in relation to the holding body 33 axially. The choke body 15 is for its part only able to be moved axially as part of a strictly linear movement since it is fixed in relation to the holding body 33 by rotation preventing means 45, which for their part do not obstruct its axial motion. The rotation preventing means 45 may have a longitudinal groove 46 provided inside the choke body 15, into which a retaining catch 47, provided on the holding body 33, fits or vice versa.

Furthermore a screw threaded connection 48 is provided between the rotary actuating member 43 and the choke body 15. The choke body 15 may for instance be provided with an external thread into which an internal thread, provided on the rotary actuating member 43, fits or the other round.

If the rotary actuating member 43 is turned as indicated by the double arrow 50, it will retain its axial position without any change. However the choke body 15, which is prevented from rotating, will perform an axial setting movement as indicated by the double arrow 19.

In the working example detent means 49 are also provided, which render possible a releasable fixation in steps of the rotary actuating member 43 in different positions of rotation. For instance, it is possible to provide detent or ratchet teeth 53 extending along a circle or a circular arc, to be engaged by at least one catch 54 fits, which is provided on the rotary actuating member 43 or vice versa.

The choke valves of the working embodiment render possible a design with a linear law in such a manner that the intensity of choking is linearly dependent on the preset setting of the choke piston 17. Using a simple scale it is then possible to set to different positions which can be extremely simply reproduced, more particularly because the setting operations themselves are not accompanied by variations in flow rate.

In connection with individually distributed transfer openings 12 in accordance with the embodiments of FIGS. 1 through 3 it would for example be possible to have such a size and distribution of the transfer openings 12 that for each rotational step of the rotary actuating member 43, which for instance may be predetermined by the detent means 49, a further additional inlet flow duct 11 may be exactly shut off or made available for flow and accordingly the available aperture will be changed.

The functions of the holding body 33 and of the tail 34 may be performed directly by components of the housing 2. The present integration in a separate valve cartridge 27, which thus also bears the choke body 15 and the rotary actuating member 43 and possibly the valve member of the check valve 37, does however have the advantage of extremely simple possibilities of use. To the extent that only one respective adapted recess 28 is provided, the valve cartridge 27 can be integrated in any suitable housing, that is to say for example also directly in the housing of a fluid power drive and more especially with the function of a speed regulating valve.

The choke valves of the working examples are designed for manual operation. However a design for fluid operation and more particularly pneumatic operation and/or electrical operation would be possible as well. The choke body could in this case be provided with a suitable fluid power and/or electrical actuating means.

What is claimed is:

1. A choke valve comprising:
   a valve housing having an inlet and an outlet,
   a choke body, selectively positionable in the valve housing for adjusting a flow aperture, the choke body including a cylindrical choke piston, which plunges coaxially into an inlet flow duct communicating with the inlet, said choke piston being in sealing contact at a peripheral seal area with a wall of the inlet flow duct, the axial position of the seal area being dependent on a choke setting of the choke piston, a plurality of outlet ducts being provided in the wall of the inlet flow duct, the outlet ducts communicating with the outlet and with transfer openings in the wall distributed along a setting stroke of the seal area, the flow aperture being defined by a cross section of the transfer openings, which is open to an upstream section of the inlet flow duct, and at least one bypass duct not influenced by the choke body disposed between the inlet and the outlet, and a check valve adapted to prevent flow toward said outlet.

2. The choke valve as set forth in claim 1, wherein the outlet flow ducts are at least partially constituted by separate ducts similar to drilled holes.

3. The choke valve as set forth in claim 1, wherein the transfer openings are distributed along a helical line about a periphery of the inlet flow duct.

4. The choke valve as set forth in claim 1, wherein an annular space is defined coaxially about the wall of the inlet flow duct, said outlet flow ducts opening into said space, said space communicating with said outlet.

5. The choke valve as set forth in claim 1, wherein the outlet flow ducts are at least partially constituted by interstices of said porous wall of said inlet floe duct.

6. The choke valve as set forth in claim 1, wherein the wall of the inlet flow duct and the choke body are a component of a valve cartridge insertable into a housing.

7. The choke valve as set forth in claim 6, wherein the inlet flow duct wall is an insert component anchored in a holding body of the valve cartridge.

8. The choke valve as set forth in claim 1, wherein between the wall of the inlet flow duct and the choke body a further seal area is disposed axially opposite to a section of the inlet flow duct.

9. The choke valve as set forth in claim 1, wherein the choke body is provided with a rotary actuating member for setting it in place linearly.

* * * * *

UNITED STATES PATENT AND TRADEMARK OFFICE
CERTIFICATE OF CORRECTION

PATENT NO. : 6,325,101 B1  Page 1 of 1
DATED : April 4, 2002
INVENTOR(S) : Kurt Stoll et al.

It is certified that error appears in the above-identified patent and that said Letters Patent is hereby corrected as shown below:

<u>Title page,</u>
ABSTRACT,
Line 2, now reads "choke position..." should read -- choke piston... --;
Line 5, now reads "wall of the flow..." should read -- wall of the inlet flow... --;

<u>Column 5,</u>
Line 61, now reads "choke body..."; should read -- choke body 15... --;

<u>Column 8,</u>
Line 7, now reads "inlet floe duct..."; should read -- inlet flow duct... --.

Signed and Sealed this

Third Day of September, 2002

*Attest:*

JAMES E. ROGAN
*Director of the United States Patent and Trademark Office*

*Attesting Officer*